April 28, 1959      A. MORA      2,883,748
HAND-OPERATED SLICING DEVICES FOR BAKERY PRODUCTS
Filed May 20, 1953      2 Sheets-Sheet 1
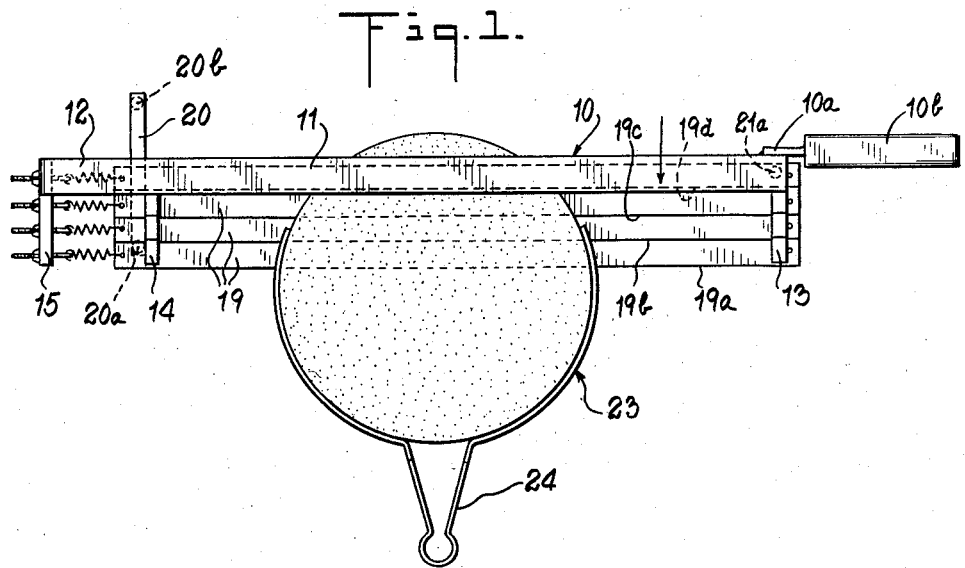
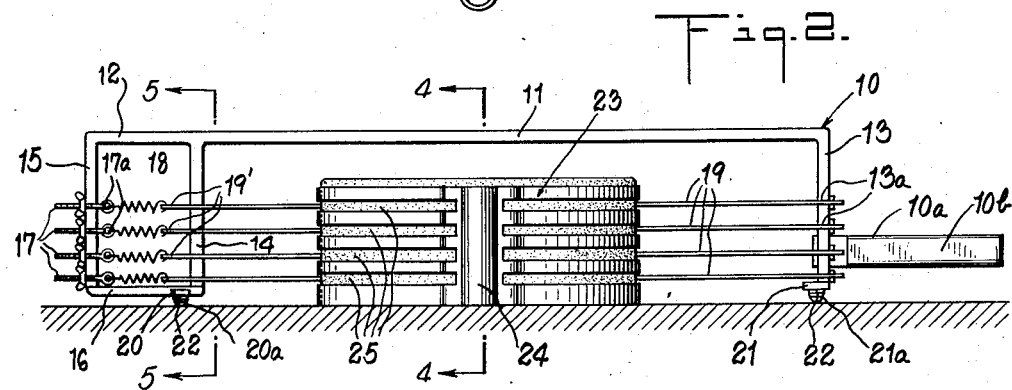
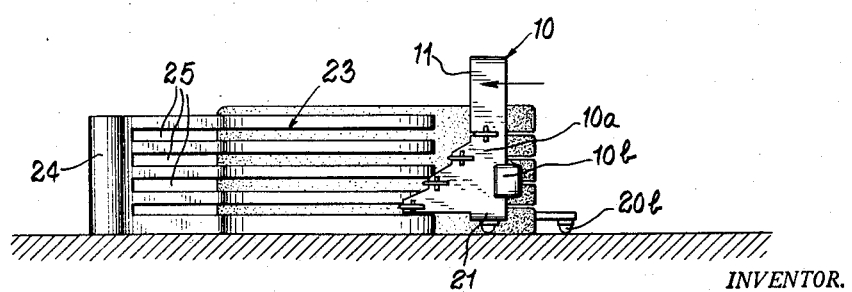
INVENTOR.
ANTONIO MORA
BY
Joseph F. O'Brien
ATTORNEY

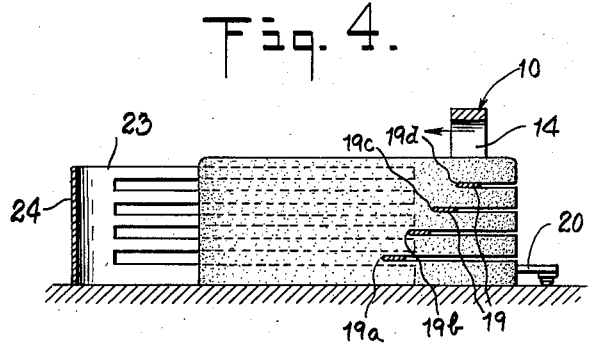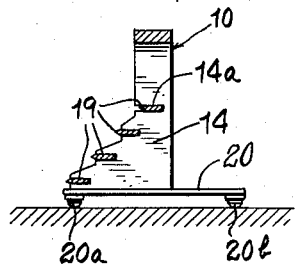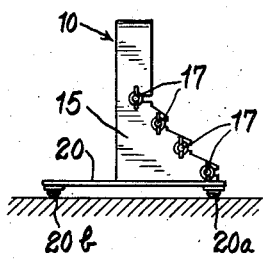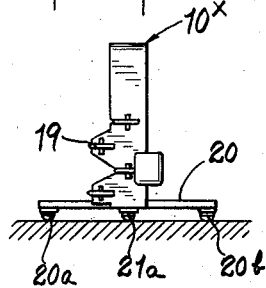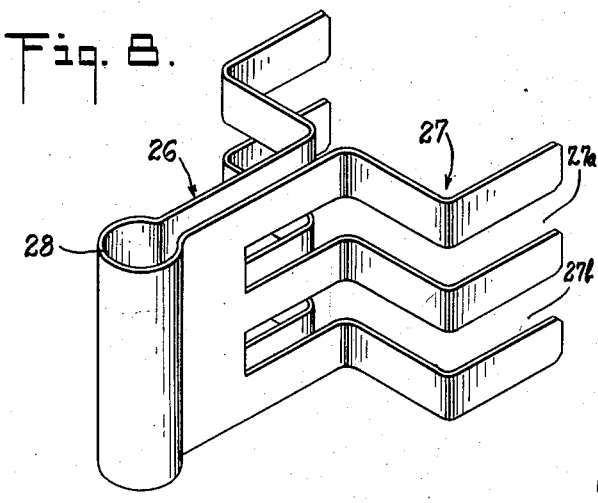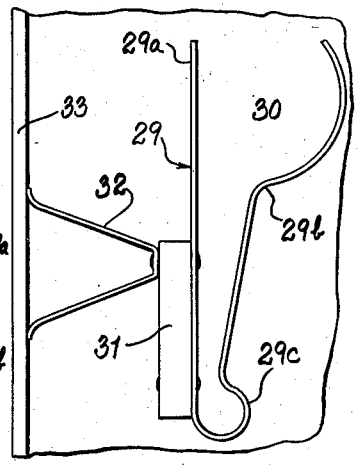

United States Patent Office 2,883,748
Patented Apr. 28, 1959

2,883,748

HAND-OPERATED SLICING DEVICES FOR BAKERY PRODUCTS

Antonio Mora, New York, N.Y., assignor of one-half to Kurt Schlegel, New York, N.Y.

Application May 20, 1953, Serial No. 356,180

2 Claims. (Cl. 30—304)

This invention relates to improvements in hand-operated slicing devices for bakery products and holders therefor.

One of the objects of this invention is to produce a hand-operated slicing device for bakery products provided with a frame having multiple knives or blades that may be moved horizontally along a flat table or surface and may be simultaneously reciprocated on and guided by said flat surface to cause slicing knives carried thereby to sever a bakery product held by a cooperating holder into a plurality or series of slices.

Another object of my invention is in a slicing device of the character specified to provide a plurality or series of blades or knives mounted in a vertically disposed frame to extend horizontally and arranged vertically, one above the other, and preferably having their cutting edges positioned in varying vertical planes relatively to the longitudinal axis of the frame.

Another object of my invention is to provide a slicing device of the character specified in which the knife-mounting frame is supported on a carriage engaging and adapted to be moved manually along a flat surface such as a table top and to be reciprocated thereon to cause the blades or knives to cut bakery products suitably positioned and held on said table top by cooperating holders.

Another object is in a slicing device of the character specified to provide a carriage that is triangular in conformation and supported on anti-friction devices to enable, during the slicing operation, a facile manipulation of the device along a flat surface both in reciprocation of the frame as well as in movement forwardly, rearwardly and angularly along such surface.

Another object comprises the provision of a carriage of the triangular conformation which is provided with ball-bearings so positioned as to permit facile manipulation and adapted to roll along a flat guiding surface during the reciprocating and longitudinal movements of the device by hand along such surface and into contact with the bakery products to be sliced.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of a slicing device and holder therefor embodying my invention and showing the same in connection with a cake partly sliced thereby;

Fig. 2 is a view in side elevation of the slicing device, holder and cake illustrated in plan in Fig. 1;

Fig. 3 is an end elevation showing my slicing device holder and cake in the slicing operation illustrated in Figs. 1 and 2;

Fig. 4 is a vertical section on the line 4—4 of Fig. 2 looking in the direction of the arrow;

Fig. 5 is a similar section on the line 5—5 of Fig. 2 looking in the direction of the arrow;

Fig. 6 is a rear end elevation of my slicing device removed from the cake and holder and illustrating my preferred form of frame and knife or blade mounting;

Fig. 7 is an end elevation of a form of slicing device with a modified form of mounting for the knives or blades in the frame;

Fig. 8 is a modified form of holder for bakery products adapted for use with my slicing device; and Fig. 9 is another modified form of holder for bakery products adapted to be held in position by engagement with a rail on the table.

Referring now to these drawings which illustrate a preferred embodiment of my invention, the numeral 10 indicates a vertically-disposed knife-carrying frame preferably composed of a suitable metal such as steel or aluminum and being of substantially rectangular configuration and provided at its forward end $10^a$ with an operating handle $10^b$ for hand operation. As shown, said frame 10 comprises an elongated rectangular blade-mounting section 11 to the forward end of which the handle $10^b$ is connected, and a rearwardly-disposed substantially square spring mounting section 12, these sections being formed integrally with each other and are disposed in alignment to produce a single knife-carrying frame.

The frame section 11 is provided with a vertically-disposed forward end member 13, a partition member 14 and a vertically-disposed rear end member 15. As shown, the rear end member 15 cooperates with the vertically-disposed partition member 14 to form the spring-mounting section and the members 13 and 14 cooperate to form the knife-mounting section. The spring-mounting section is preferably closed at its bottom portion by a rail member 16 and a series of tensioning bolts 17 and springs 18 are mounted on said section, the tensioning bolts being, as shown, mounted in the vertical partition member 15 while the springs are stretched in the space between the members 14 and 15.

The partition members 13 and 14, respectively, are provided with slots or kerfs $13^a$, $14^a$ and knife blades 19 are mounted therein, while the springs 18 are stretched between the inner ends $17^a$ of the bolt members 17 and the end portions $19'$ of the knife blades 19.

As shown, the handle $10^b$ is connected to the lower portion of the partition member 13, this connection preferably being below the middle portion thereof and adjacent to the bottom of the knife-carrying frame so that the manipulating stress on the frame will be applied on the said frame along a plane below the horizontal center line or axis of the frame and close to the support thereof while it is being manipulated in order to enable such horizontal manipulation of the frame without any toppling thereof.

In the preferred embodiment of my invention, the frame is mounted at its rear and front ends upon two members which form a supporting carriage for the knife-carrying frame and this carriage is provided with anti-friction devices. Said supporting carriage of the frame comprises triangularly positioned elements comprising a rear supporting base member 20 and a forward supporting base member 21. As shown, the supporting base member 20 is an elongated mounting member for an anti-friction element and is positioned to extend at a right angle from the frame at a point adjacent to but removed inwardly from the outer end 15 of the frame, and, as illustrated, this supporting member 20 is connected to the bottom of the frame at a point beneath the forward edge thereof and projects rearwardly beyond the rear edge of said frame so as to provide an efficient balancing support for said rear end of the frame, As illustrated, the members 20 and 21 are provided with ball-bearings 20a, 20b and 21a and these three triangularly-arranged ball-bearings are adapted to slide along a flat surface such as a table in a bakery and to securely support the frame 10 and its knife blades during horizontal reciprocating and sliding motions for the purpose of cutting a bakery product, as hereinafter more particularly specified.

The handle 10b which is preferably positioned below the horizontal axis of the frame is also placed at the rear of the frame and preferably in close adjacency to the ball-bearing member 21 of the supporting carriage. The handle is thus located at a position which is midway between the ends of the supporting carriage member 20, thus enabling the force applied through the handle to be applied symmetrically in relation to the supporting case or carriage.

It is desirable in a device of the character specified not only to provide a series of knife-blades mounted in the frame in vertically-disposed position but because it is desirable to engage the cake successively with each of the knives, instead of simultaneously, I provide in the preferred form of my invention means for mounting the blades 19 in the frame in varying horizontal positions so as to cause the cutting edges of these knives to be arranged in varying vertical planes relatively to the axis of the frame, thus, as aforesaid, enabling the blades to operate successively. As illustrated, the lowermost knife is adapted to enter the cake first, the next knife above said lowermost knife is adapted to enter the cake secondly, the third and fourth knife then successively entering the cake.

As may be seen in Figs. 1, 3, 4, 5 and 6, I have shown the knife-supporting members 13 and 14 projecting forwardly with the mounting kerfs therein disposed in a step-down successively-displaced relationship to each other. Thus, the cutting edges 19a of the lowermost blade are in the most forward position, the cutting edge 19b of the next blade above said lowermost blade is arranged in a position behind and spaced from the edge 19a, while the edges 19c and 19d of the other intermediate and top blades are similarly stepped back rearwardly and have their edges spaced rearwardly from the edges of an adjacent blade.

It will be understood that the frame will be supported upon a flat surface such as a table in a bakery and that an operator taking the handle will be enabled to move this frame with its knife blades forwardly in a forward direction into contact with the cake for the purpose of cutting the same, and in the preferred embodiment of my invention I preferably provide suitable holders for the bakery products. Thus in Fig. 1 I have shown a circular cup-shaped holder body 23 provided with a suitable handle 24 and this holder body is, as more particularly shown in Figs. 2, 3 and 4, provided with a series of horizontal slots 25 adapted to permit the passage therethrough of the knife blades 19 during the forward manipulation of the frame along a table or other flat surface.

In Figs. 1 to 5 I have shown my preferred form of knife-carrying frame in section, and in Fig. 4 I have shown in section the blades entering the circular cake shown in Figs. 1 to 3, and in Fig. 6 I have shown an end view of the outer end of my preferred form of knife-carrying frame illustrating the shape of said end and the positioning of the adjusting bolts in kerfs therein.

In Figs. 7, however, I have illustrated a modified form of knife-carrying frame 10x in which, instead of the four knives being mounted in successively stepped relationship to each other, said blades are mounted in a series of two successively-stepped mountings instead of four.

Also in Figs. 8 and 9, I have shown modified forms of holder derives. Thus, in Fig. 8 I have shown a modified form of holder device 26 which is provided with a handle 28 and a rectangular cake-receiving opening 27 and is also provided with slots 27a—27b.

Also in Fig. 9 I have shown still another modified form of cake holder 29 comprising a stationary straight member 29a formed integrally with a handle 29c and having a bendable resilient member 29b having straight and circular portions. These members 29a and 29b are positioned in relation to each other to provide, as shown, a round opening 30, and because of the positioning of the members 29a and 29b the shape of this opening 30 may be changed in any suitable manner. This member 29, as illustrated, is mounted upon a block 31 which in turn is mounted upon a rail-engaging spacer member 32 engaging the table rail 33.

Both forms of my knife carrying frame member will operate in substantially the same manner. Thus, an operator taking hold of the handle 10b will first place the knife-carrying frame in supported position on a suitable flat surface such as a table in a bakery, and then will simultaneously reciprocate and move in a forward direction the said knife-carrying frame until the same engages and cuts through a cake, which is suitably supported upon the flat surface or table on which the knife-carrying frame is mounted.

In the preferred embodiment of my invention this bakery product or cake is mounted within a holder such as the holders 23—26 or 29. Obviously, a knife-carrying frame supported as shown by a triangular supporting carriage will be readily reciprocable and movable forwardly into cutting contact with such bakery product or cake.

Having described my invention, I claim:

1. A hand-operated slicing device for bakery products comprising a vertically-disposed knife-mounting frame member provided with horizontally-disposed anti-frictional supporting feet and having at one end a handle, said knife-mounting frame being provided above said feet with a plurality of spaced blade-supporting kerfs, a plurality of knife blades supported in said kerfs, and mounted in horizontal position in said frame in substantially parallel spaced relationship to each other, and fastening means for engaging said blades to retain the same within said supporting kerfs, said frame being freely movable over a horizontally-disposed flat surface of a table, said horizontally-disposed, anti-frictional supporting feet being arranged during such free movement to contact with said horizontally-disposed flat table surface and so to guide said mounting frame and blades as to cause said frame to extend in a plane perpendicular to said flat surface and the blades carried by said frame to extend, move and slice in planes parallel with said surface, said horizontally-disposed anti-frictional supporting feet of the knife-mounting frame comprising a plurality of feet having an anti-frictional supporting foot at each of the opposite sides of a perpendicular plane extending longitudinally and axially of said frame and the plurality of knife blades having their cutting edges positioned in said frame in varying vertical planes relatively to each other.

2. A hand-operated plural blade slicing device for bakery products comprising a relatively wide supporting-base member extending along and to opposite sides of the middle line of the slicing device and provided on its bottom surface with a series of ball bearing supporting feet disposed in triangular relationship to each other and in the same plane, said ball bearing supporting feet embodying one member positioned substantially at the said middle line and another pair of members spaced from each other to extend a considerable distance at opposite sides of said middle line, a vertically-disposed knife-mounting frame member having forward and rear sides and mounted on said base member to extend substantially along and over said middle line, a handle projecting from one end of said frame member at a point closely adjacent to said middle line for moving said knife-mounting frame and base member in a reciprocatory movement, said supporting base member and knife-mounting frame member being freely movable reciprocably over a horizontally-disposed flat surface, said knife-mounting frame member being provided above said base member with at least one blade-supporting kerf extending to the forward side of said frame member, a knife blade disposed in said kerf with its cutting edge extending to the forward side of said knife-mounting frame and arranged in a horizontal position in parallelism with said supporting surface and substantially over and above said middle line of the slicing device, fastening means for engaging the said blade to retain the same within said knife-supporting kerf, said horizontally-disposed ball bearing supporting feet being arranged during reciprocating movement of the base and frame members over said table surface in contact with said horizontally-disposed flat surface thereof and thus so to guide said supporting-base and mounting frame with the blade therein as to cause said frame to extend in a plane perpendicular to said flat surface and to cause the blade carried thereby to extend for a reciprocating movement in a plane parallel with said flat table surface.

References Cited in the file of this patent

UNITED STATES PATENTS

| | | |
|---|---|---|
| 190,219 | Jackson | May 1, 1877 |
| 725,569 | Kirby | Apr. 14, 1903 |
| 978,360 | Crosby | Dec. 13, 1910 |
| 1,416,723 | Krafft | May 23, 1922 |
| 1,614,772 | Bambini et al. | Jan. 18, 1927 |
| 1,866,960 | Zimmer | July 12, 1932 |
| 2,115,102 | Gottfried et al. | Apr. 26, 1938 |
| 2,483,763 | Edwards | Oct. 4, 1949 |
| 2,612,198 | Schlegel | Sept. 30, 1952 |